United States Patent
McCloud et al.

(10) Patent No.: US 10,050,733 B2
(45) Date of Patent: *Aug. 14, 2018

(54) ADVANCED SIGNAL PROCESSORS FOR INTERFERENCE CANCELLATION IN BASEBAND RECEIVERS

(71) Applicant: III Holdings 1, LLC, Wilmington, DE (US)

(72) Inventors: Michael L. McCloud, Boulder, CA (US); Vijay Nagarajan, Boulder, CO (US)

(73) Assignee: III HOLDINGS 1, LLC, Wilmington, DE (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/924,196

(22) Filed: Oct. 27, 2015

(65) Prior Publication Data
US 2016/0050041 A1   Feb. 18, 2016

Related U.S. Application Data (63) Continuation of application No. 14/108,333, filed on Dec. 16, 2013, now Pat. No. 9,172,411, which is a
(Continued)

(51) Int. Cl.
*H04B 7/216* (2006.01)
*H04J 11/00* (2006.01)
(Continued)

(52) U.S. Cl.
CPC ............ *H04J 11/0023* (2013.01); *H04B 1/10* (2013.01); *H04B 1/7103* (2013.01);
(Continued)

(58) Field of Classification Search
None
See application file for complete search history.

(56) References Cited

U.S. PATENT DOCUMENTS 3,742,201 A   6/1973   Groginsky ............... 235/156
4,088,955 A   5/1978   Baghdady ............... 325/56
(Continued)

FOREIGN PATENT DOCUMENTS

DE   4201439   7/1993   ............ H04L 27/00
DE   4326843   2/1995   ............ H04B 7/08
(Continued)

OTHER PUBLICATIONS

G.M.A. Sessler, "Low Complexity Polynomial Expansion Multiuser Detector for CDMA Systems", IEEE Trans. on Veh. Tech. 54(4), 1379-1391.
(Continued)

*Primary Examiner* — Michael J Moore, Jr.
(74) *Attorney, Agent, or Firm* — McAndrews, Held & Malloy, Ltd.

(57) ABSTRACT

An interference canceller comprises a composite interference vector (CIV) generator configured to produce a CIV by combining soft and/or hard estimates of interference, an interference-cancelling operator configured for generating a soft projection operator, and a soft-projection canceller configured for performing a soft projection of the received baseband signal to output an interference-cancelled signal. Weights used in the soft-projection operator are selected to maximize a post-processing SINR.

17 Claims, 2 Drawing Sheets

Related U.S. Application Data continuation of application No. 12/892,874, filed on Sep. 28, 2010, now Pat. No. 8,654,689, which is a continuation of application No. 11/272,411, filed on Nov. 10, 2005, now Pat. No. 7,808,937, which is a continuation-in-part of application No. 11/233,636, filed on Sep. 23, 2005, now Pat. No. 8,761,321.

(51) Int. Cl.

| | | |
|---|---|---|
| *H04B 1/7103* | (2011.01) | |
| *H04B 1/7107* | (2011.01) | |
| *H04B 1/7117* | (2011.01) | |
| *H04J 13/20* | (2011.01) | |
| *H04B 1/10* | (2006.01) | |
| *H04J 13/00* | (2011.01) | |
| *H04W 24/06* | (2009.01) | |
| *H04B 1/7115* | (2018.01) | |
| *H04B 1/712* | (2011.01) | |

(52) U.S. Cl.
CPC ......... *H04B 1/7107* (2013.01); *H04B 1/7117* (2013.01); *H04J 13/0003* (2013.01); *H04J 13/20* (2013.01); *H04W 24/06* (2013.01); *H04B 1/712* (2013.01); *H04B 1/7115* (2013.01); *H04J 2011/0006* (2013.01)

(56) References Cited

U.S. PATENT DOCUMENTS

| | | | |
|---|---|---|---|
| 4,309,769 A | 1/1982 | Taylor, Jr. | 375/1 |
| 4,359,738 A | 11/1982 | Lewis | 343/100 |
| 4,601,046 A | 7/1986 | Halpern et al. | 375/38 |
| 4,665,401 A | 5/1987 | Garrard et al. | 342/75 |
| 4,670,885 A | 6/1987 | Parl et al. | 375/1 |
| 4,713,794 A | 12/1987 | Byington et al. | 365/45 |
| 4,780,885 A | 10/1988 | Paul et al. | 375/40 |
| 4,856,025 A | 8/1989 | Takai | 375/40 |
| 4,893,316 A | 1/1990 | Janc et al. | 375/44 |
| 4,922,506 A | 5/1990 | McCallister et al. | 375/1 |
| 4,933,639 A | 6/1990 | Barker | 324/309 |
| 4,965,732 A | 10/1990 | Roy, III et al. | 364/460 |
| 5,017,929 A | 5/1991 | Tsuda | 342/427 |
| 5,099,493 A | 3/1992 | Zeger et al. | 375/1 |
| 5,105,435 A | 4/1992 | Stilwell | 375/1 |
| 5,109,390 A | 4/1992 | Gilhousen et al. | 375/1 |
| 5,119,401 A | 6/1992 | Tsujimoto | 375/14 |
| 5,136,296 A | 8/1992 | Roettger et al. | 342/26 |
| 5,151,919 A | 9/1992 | Dent | 375/1 |
| 5,218,359 A | 6/1993 | Minamisono | 342/383 |
| 5,218,619 A | 6/1993 | Dent | 375/1 |
| 5,220,687 A | 6/1993 | Ichikawa et al. | 455/254 |
| 5,224,122 A | 6/1993 | Bruckert | 375/1 |
| 5,237,586 A | 8/1993 | Bottomley | 375/1 |
| 5,263,191 A | 11/1993 | Kickerson | 455/304 |
| 5,280,472 A | 1/1994 | Gilhousen et al. | 370/18 |
| 5,305,349 A | 4/1994 | Dent | 375/1 |
| 5,325,394 A | 6/1994 | Bruckert | 375/1 |
| 5,343,493 A | 8/1994 | Karimullah | 375/1 |
| 5,343,496 A | 8/1994 | Honig et al. | 375/1 |
| 5,347,535 A | 9/1994 | Karasawa et al. | 375/1 |
| 5,353,302 A | 10/1994 | Bi | 375/1 |
| 5,377,183 A | 12/1994 | Dent | 370/18 |
| 5,386,202 A | 1/1995 | Cochran et al. | 332/100 |
| 5,390,207 A | 2/1995 | Fenton et al. | 375/1 |
| 5,394,110 A | 2/1995 | Mizoguchi | 329/304 |
| 5,396,256 A | 3/1995 | Chiba et al. | 342/372 |
| 5,423,045 A | 6/1995 | Kannan et al. | 395/750 |
| 5,437,055 A | 7/1995 | Wheatley, III | 455/33.3 |
| 5,440,265 A | 8/1995 | Cochran et al. | 329/300 |
| 5,448,600 A | 9/1995 | Lucas | 375/205 |
| 5,481,570 A | 1/1996 | Winters | 375/347 |
| 5,506,865 A | 4/1996 | Weaver, Jr. | 375/205 |
| 5,513,176 A | 4/1996 | Dean et al. | 370/18 |
| 5,533,011 A | 7/1996 | Dean et al. | 370/18 |
| 5,553,098 A | 9/1996 | Cochran et al. | 375/324 |
| 5,602,833 A | 2/1997 | Zehavi | 370/209 |
| 5,606,560 A | 2/1997 | Malek et al. | 370/347 |
| 5,621,768 A | 4/1997 | Lechleider | |
| 5,644,592 A | 7/1997 | Divsalar et al. | 375/206 |
| 5,736,964 A | 4/1998 | Ghosh et al. | 342/457 |
| 5,761,237 A | 6/1998 | Petersen | |
| 5,787,130 A | 7/1998 | Kotzin et al. | 375/346 |
| 5,812,086 A | 9/1998 | Bertiger et al. | 342/357 |
| 5,844,521 A | 12/1998 | Stephens et al. | 342/357 |
| 5,859,613 A | 1/1999 | Otto | 342/463 |
| 5,872,540 A | 2/1999 | Casabona et al. | 342/362 |
| 5,872,776 A | 2/1999 | Yang | 370/342 |
| 5,894,500 A | 4/1999 | Bruckert et al. | 375/346 |
| 5,926,761 A | 7/1999 | Reed et al. | 455/440 |
| 5,930,229 A | 7/1999 | Yoshida et al. | 370/203 |
| 5,953,369 A | 9/1999 | Suzuki | 375/206 |
| 5,978,413 A | 11/1999 | Bender | 375/206 |
| 5,995,499 A | 11/1999 | Hottinen et al. | 370/337 |
| 6,002,727 A | 12/1999 | Uesugi | 375/346 |
| 6,014,373 A | 1/2000 | Schilling et al. | 370/342 |
| 6,018,317 A | 1/2000 | Dogan et al. | 342/378 |
| 6,032,056 A | 2/2000 | Reudink | 455/560 |
| 6,067,333 A | 5/2000 | Kim et al. | 375/346 |
| 6,078,611 A | 6/2000 | La Rosa et al. | 375/206 |
| 6,088,383 A | 7/2000 | Suzuki et al. | 375/148 |
| 6,101,385 A | 8/2000 | Monte et al. | 455/427 |
| 6,104,712 A | 8/2000 | Robert et al. | 370/389 |
| 6,115,409 A | 9/2000 | Upadhyay et al. | 375/144 |
| 6,127,973 A | 10/2000 | Choi et al. | 342/378 |
| 6,131,013 A | 10/2000 | Bergstrom et al. | 455/63 |
| 6,137,788 A | 10/2000 | Sawahashi et al. | 370/342 |
| 6,141,332 A | 10/2000 | Lavean | 370/335 |
| 6,154,443 A | 11/2000 | Huang et al. | 370/210 |
| 6,157,685 A | 12/2000 | Tanaka et al. | 375/346 |
| 6,157,842 A | 12/2000 | Karlsson et al. | 455/456 |
| 6,157,847 A | 12/2000 | Buehrer et al. | 455/561 |
| 6,163,696 A | 12/2000 | Bi et al. | 455/436 |
| 6,166,690 A | 12/2000 | Lin et al. | 342/383 |
| 6,172,969 B1 | 1/2001 | Kawakami et al. | 370/342 |
| 6,173,008 B1 | 1/2001 | Lee | 375/148 |
| 6,175,587 B1 | 1/2001 | Madhow et al. | 375/148 |
| 6,175,588 B1 | 1/2001 | Visotsky | 375/148 |
| 6,177,906 B1 | 1/2001 | Petrus | 342/378 |
| 6,185,716 B1 | 2/2001 | Riggle | 714/769 |
| 6,192,067 B1 | 2/2001 | Toda et al. | 375/144 |
| 6,201,799 B1 | 3/2001 | Huang et al. | 370/342 |
| 6,215,812 B1 | 4/2001 | Young et al. | 375/144 |
| 6,219,376 B1 | 4/2001 | Zhodzishsky et al. | 375/148 |
| 6,222,828 B1 | 4/2001 | Ohlson et al. | 370/320 |
| 6,230,180 B1 | 5/2001 | Mohamed | 708/523 |
| 6,233,229 B1 | 5/2001 | Ranta et al. | 370/330 |
| 6,233,459 B1 | 5/2001 | Sullivan et al. | 455/456 |
| 6,240,124 B1 | 5/2001 | Wiedeman et al. | 375/130 |
| 6,252,535 B1 | 6/2001 | Kober et al. | 341/155 |
| 6,256,336 B1 | 7/2001 | Rademacher et al. | 375/140 |
| 6,259,688 B1 | 7/2001 | Schilling et al. | 370/342 |
| 6,263,208 B1 | 7/2001 | Chang et al. | 455/456 |
| 6,266,529 B1 | 7/2001 | Chheda | 455/436 |
| 6,269,075 B1 | 7/2001 | Tran | 370/206 |
| 6,275,186 B1 | 8/2001 | Kong | 342/363 |
| 6,278,726 B1 | 8/2001 | Mesecher et al. | 375/148 |
| 6,282,231 B1 | 8/2001 | Norman et al. | 375/144 |
| 6,282,233 B1 | 8/2001 | Yoshida | 375/148 |
| 6,285,316 B1 | 9/2001 | Nir et al. | 342/357.09 |
| 6,285,319 B1 | 9/2001 | Rose | 342/449 |
| 6,285,861 B1 | 9/2001 | Bonaccorso et al. | 455/137 |
| 6,295,311 B1 | 9/2001 | Sun | 375/147 |
| 6,301,289 B1 | 10/2001 | Bejjani et al. | 375/144 |
| 6,304,618 B1 | 10/2001 | Hafeez et al. | 375/341 |
| 6,308,072 B1 | 10/2001 | Labedz et al. | 455/448 |
| 6,310,704 B1 | 10/2001 | Dogan et al. | 359/127 |
| 6,317,453 B1 | 11/2001 | Chang | 375/140 |
| 6,321,090 B1 | 11/2001 | Soliman | 455/440 |
| 6,324,159 B1 | 11/2001 | Mennekens et al. | 370/203 |
| 6,327,471 B1 | 12/2001 | Song | 455/440 |
| 6,330,460 B1 | 12/2001 | Wong et al. | 455/562 |
| 6,333,947 B1 | 12/2001 | van Heeswyk et al. | 375/148 |

(56) References Cited

U.S. PATENT DOCUMENTS

| | | | |
|---|---|---|---|
| 6,351,235 B1 | 2/2002 | Stilp | 342/357.06 |
| 6,351,642 B1 | 2/2002 | Corbett et al. | 455/442 |
| 6,359,874 B1 | 3/2002 | Dent | 370/342 |
| 6,362,760 B2 | 3/2002 | Kober et al. | 341/141 |
| 6,363,104 B1 | 3/2002 | Bottomley | 375/148 |
| 6,377,607 B1 | 4/2002 | Ling et al. | 375/130 |
| 6,377,636 B1 | 4/2002 | Paulraj et al. | 375/346 |
| 6,380,879 B2 | 4/2002 | Kober et al. | 341/155 |
| 6,385,264 B1 | 5/2002 | Terasawa et al. | 375/371 |
| 6,396,804 B2 | 5/2002 | Odenwalder | 370/209 |
| 6,404,760 B1 | 6/2002 | Holtzman et al. | 370/342 |
| 6,414,949 B1 | 7/2002 | Boulanger | 370/335 |
| 6,430,216 B1 | 8/2002 | Kober | 375/148 |
| 6,449,246 B1 | 9/2002 | Barton et al. | 370/328 |
| 6,459,693 B1 | 10/2002 | Park et al. | 370/342 |
| 6,466,611 B1 | 10/2002 | Bachu | 375/144 |
| 6,501,788 B1 | 12/2002 | Wang et al. | 375/148 |
| 6,515,980 B1 | 2/2003 | Bottomley | 370/342 |
| 6,522,683 B1 | 2/2003 | Smee | 375/144 |
| 6,570,909 B1 | 5/2003 | Kansakoski et al. | 375/148 |
| 6,570,919 B1 | 5/2003 | Lee | 375/233 |
| 6,574,270 B1 | 6/2003 | Madkour et al. | 375/148 |
| 6,580,771 B2 | 6/2003 | Kenney | 375/346 |
| 6,584,115 B1 | 6/2003 | Suzuki | 370/441 |
| 6,590,888 B1 | 7/2003 | Ohshima | 370/342 |
| 6,665,349 B1 | 12/2003 | Cherubini | |
| 6,668,011 B1 | 12/2003 | Li et al. | 375/147 |
| 6,680,727 B2 | 1/2004 | Butler et al. | 345/147 |
| 6,687,723 B1 | 2/2004 | Ding | 708/322 |
| 6,690,723 B1 | 2/2004 | Gosse | 375/233 |
| 6,711,219 B2 | 3/2004 | Thomas et al. | 375/346 |
| 6,714,585 B1 | 3/2004 | Wang et al. | 375/148 |
| 6,724,809 B2 | 4/2004 | Reznik | 375/148 |
| 6,741,634 B1 | 5/2004 | Kim et al. | 375/144 |
| 6,754,340 B1 | 6/2004 | Ding | 379/406.08 |
| 6,798,737 B1 | 9/2004 | Dabak et al. | 370/209 |
| 6,798,850 B1 | 9/2004 | Wedin et al. | 375/340 |
| 6,801,565 B1 | 10/2004 | Bottomley et al. | 375/148 |
| 6,829,313 B1 | 12/2004 | Xu | 375/341 |
| 6,839,390 B2 | 1/2005 | Mills | 375/224 |
| 6,882,678 B2 | 4/2005 | Kong et al. | 375/144 |
| 6,912,250 B1 | 6/2005 | Adireddy | 375/232 |
| 6,931,052 B2 | 8/2005 | Fuller | 375/144 |
| 6,956,893 B2 | 10/2005 | Frank | 375/147 |
| 6,963,546 B2 | 11/2005 | Misra | 370/294 |
| 6,975,666 B2 | 12/2005 | Affes et al. | 375/130 |
| 6,975,669 B2 | 12/2005 | Ling | 375/141 |
| 6,975,671 B2 | 12/2005 | Sindhushayana | 375/144 |
| 7,010,073 B2 | 3/2006 | Black et al. | 375/355 |
| 7,027,533 B2 | 4/2006 | Abe et al. | 375/341 |
| 7,200,183 B2 | 4/2007 | Olson et al. | 375/285 |
| 7,245,679 B2 | 7/2007 | Aoki et al. | 375/349 |
| 7,292,623 B2 | 11/2007 | Reznik | 375/148 |
| 7,373,128 B2 | 5/2008 | Dowling | 455/513 |
| 7,394,879 B2 | 7/2008 | Narayan et al. | 375/346 |
| 7,397,842 B2 | 7/2008 | Bottomley et al. | 375/148 |
| 7,430,253 B2 | 9/2008 | Olson et al. | 375/316 |
| 7,440,490 B2 | 10/2008 | Kidiyarova-Shevchenko et al. | 375/148 |
| 7,440,492 B2 | 10/2008 | Maruyama | 375/148 |
| 7,463,609 B2 | 12/2008 | Scharf et al. | 370/355 |
| 7,477,710 B2 | 1/2009 | Narayan | 375/349 |
| 7,577,186 B2 | 8/2009 | Thomas et al. | 375/148 |
| 7,733,941 B2 | 6/2010 | McCloud | |
| 7,808,937 B2 * | 10/2010 | McCloud | H04B 1/7103 370/286 |
| 7,876,810 B2 | 1/2011 | McCloud | |
| 8,005,128 B1 | 8/2011 | Lamba | |
| 8,090,006 B2 * | 1/2012 | Narayan | H04B 1/7107 375/148 |
| 8,121,177 B2 | 2/2012 | Narayan | |
| 8,654,689 B2 * | 2/2014 | McCloud | H04B 1/7103 370/286 |
| 9,172,411 B2 * | 10/2015 | McCloud | H04B 1/7103 |
| 2001/0003443 A1 | 6/2001 | Velazquez et al. | 342/367 |
| 2001/0020912 A1 | 9/2001 | Naruse et al. | 342/357.06 |
| 2001/0021646 A1 | 9/2001 | Antonucci et al. | 455/404 |
| 2001/0028677 A1 | 10/2001 | Wang et al. | 375/148 |
| 2001/0046266 A1 | 11/2001 | Rakib et al. | 375/259 |
| 2002/0001299 A1 | 1/2002 | Petch et al. | 370/350 |
| 2002/0021747 A1 | 2/2002 | Sequeira | 375/148 |
| 2002/0051433 A1 | 5/2002 | Affes et al. | 370/335 |
| 2002/0060999 A1 | 5/2002 | Ma | 370/329 |
| 2002/0131534 A1 | 9/2002 | Ariyoshi | 375/148 |
| 2002/0154717 A1 | 10/2002 | Shima | 375/148 |
| 2002/0172173 A1 | 11/2002 | Schilling et al. | 370/335 |
| 2002/0176488 A1 | 11/2002 | Kober | 375/147 |
| 2002/0186761 A1 | 12/2002 | Corbaton et al. | 375/231 |
| 2002/0191676 A1 | 12/2002 | O'Hagan | 375/130 |
| 2003/0035468 A1 | 2/2003 | Corbaton et al. | 375/148 |
| 2003/0050020 A1 | 3/2003 | Erceg et al. | 455/101 |
| 2003/0053524 A1 | 3/2003 | Dent | 375/148 |
| 2003/0053526 A1 | 3/2003 | Reznik | 375/148 |
| 2003/0092456 A1 | 5/2003 | Dent | 455/503 |
| 2003/0095590 A1 | 5/2003 | Fuller | 375/144 |
| 2003/0156630 A1 | 8/2003 | Sriram | 375/148 |
| 2003/0198201 A1 | 10/2003 | Ylitalo et al. | 370/329 |
| 2003/0202568 A1 | 10/2003 | Choi et al. | 375/144 |
| 2003/0210667 A1 | 11/2003 | Zhengdi | 375/130 |
| 2003/0219085 A1 | 11/2003 | Endres | 375/233 |
| 2004/0008765 A1 | 1/2004 | Chung | 375/233 |
| 2004/0013190 A1 | 1/2004 | Jayaraman | 375/233 |
| 2004/0017867 A1 | 1/2004 | Thomas et al. | 375/346 |
| 2004/0022302 A1 * | 2/2004 | Olson | G01S 5/0215 375/148 |
| 2004/0030534 A1 * | 2/2004 | Thomas | G01S 19/21 702/189 |
| 2004/0136445 A1 | 7/2004 | Olson et al. | 375/316 |
| 2004/0146093 A1 | 7/2004 | Olson | 375/148 |
| 2004/0161065 A1 | 8/2004 | Buckley | 375/350 |
| 2004/0190601 A1 | 9/2004 | Papadimitriou | 375/148 |
| 2004/0196892 A1 | 10/2004 | Reznik | 375/148 |
| 2004/0264552 A1 | 12/2004 | Smee | 375/148 |
| 2005/0031060 A1 * | 2/2005 | Thomas | H04B 1/7105 375/346 |
| 2005/0084045 A1 | 4/2005 | Stewart | 375/350 |
| 2005/0111566 A1 | 5/2005 | Park et al. | 375/267 |
| 2005/0129107 A1 | 6/2005 | Park | 375/233 |
| 2005/0163196 A1 | 7/2005 | Currivan et al. | 375/144 |
| 2005/0180364 A1 * | 8/2005 | Nagarajan | H04K 3/228 370/335 |
| 2005/0195889 A1 | 9/2005 | Grant et al. | 375/148 |
| 2005/0201499 A1 | 9/2005 | Jonsson | 375/348 |
| 2005/0223049 A1 | 10/2005 | Regis | 708/319 |
| 2005/0243908 A1 | 11/2005 | Heo | 375/233 |
| 2005/0259770 A1 | 11/2005 | Chen | 375/229 |
| 2006/0013289 A1 | 1/2006 | Hwang | 375/346 |
| 2006/0072654 A1 | 4/2006 | Nielsen | 375/148 |
| 2006/0153283 A1 * | 7/2006 | Scharf | H04B 1/7107 375/148 |
| 2006/0227730 A1 | 10/2006 | McCloud et al. | 370/286 |
| 2006/0227854 A1 | 10/2006 | McCloud et al. | 375/148 |
| 2007/0041310 A1 | 2/2007 | Tulino | 370/205 |
| 2011/0064172 A1 | 3/2011 | Olson | |
| 2011/0080923 A1 | 4/2011 | McCloud | |

FOREIGN PATENT DOCUMENTS

| | | | |
|---|---|---|---|
| DE | 4343959 | 6/1995 | H04B 7/08 |
| EP | 0558910 | 1/1993 | H04B 1/16 |
| EP | 0610989 | 1/1994 | H04B 7/04 |
| EP | 1179891 | 2/2002 | H04B 1/707 |
| GB | 2280575 | 2/1995 | H04L 27/227 |
| JP | 2000-13360 | 1/2000 | H04J 13/04 |
| WO | WO 93/12590 | 6/1995 | H04B 7/26 |
| WO | WO 2001/089107 | 11/2001 | H04B 1/707 |
| WO | WO 02/080432 | 10/2002 | |

OTHER PUBLICATIONS

Preliminary Amendment submitted on Sep. 13, 2010, re U.S. Appl. No. 12/274,551. 7 pages.

(56) References Cited

OTHER PUBLICATIONS

Notice of Allowance and Fee(s) Due, dated Sep. 3, 2010, in re U.S. Appl. No. 12/426,083, includes Supplemental NOA and Information Disclosure Citation. 5 pages.
Information Disclosure Statement submitted May 1, 2011 re U.S. Appl. No. 11/233,636. 9 Pages.
Non-Final Office Action dated Jul. 31, 2008 for U.S. Appl. No. 11/100,935 for response dated Apr. 7, 2005, includes Notice of References Cited and Information Disclosure Statements. 56 pages.
Non-Final Office Action dated Jul. 31, 2008 for U.S. Appl. No. 11/100,935 dated Apr. 7, 2005, 42 pages.
B. Widrow, S. Stearns, "Adaptive Signal Processing", Prentice Hall, Signal Processing Series, ISBN 0-13-004029-01, 1985.
G.M.A. Sessler, "Low Complexity Polynomial Expansion Multiuser Detector for CDMA Systems", IEEE Trans. On Veh. Tech., vol. 54, No. 4, pp. 1379-1391, Jul. 2005.
Advisory Action Before the Filing of an Appeal Brief Office Action for reply filed Aug. 17, 2010, dated Sep. 1, 2010, in U.S. Appl. No. 11/266,928. 2 pages.
AFFES, Sofiene; Hansen, Henrik; and Mermelstein, Paul, "Interference Subspace Rejection: A Framework for Multiuser Detection in Wideband CDMA," IEEE Journal on Selected Areas in Communications, vol. 20, No. 2, Feb. 2002. 16 pages.
Alexander, Paul D., Rasmussen, Lars K., and Schlegel, Christian B., "A Linear Receiver for Coded Multiuser CDMA," IEEE transactions on Communications, vol. 45, No. 5, May 1997. 6 pages.
Behrens, Richard T. and Scharf, Louis I., "Signal Processing Applications of Oblique Projection Operators," IEEE Transactions on Signal Processing, vol. 42, No. 6, Jun. 1994, pp. 1413-1424. 12 pages.
Behrens, Richard T. and Scharf, Louis L., "Parameter Estimation in the Presence of Low Rank Noise," Proceedings of the Twenty-second Asilomar Conference on signals,systems and Computers, Pacific Grove, C.A,22ACSSC-12/88/0341, pp. 341-344, Maple Press, Nov. 1988. 4 pages.
Behrens, Richard T., "Subspace Signal Processing in Structured Noise," UMI Dissertation Services, Ann Arbor, MI, US, Nov. 30, 1990. 117 pages.
Best, Roland E., "Phase-Locked Loops—Design, Simulation, and Applications," 4th edition, McGraw-Hill, 1999. 23 pages.
Cheng, Unjeng, Hurd, William J., and Statman, Joseph I., "Spread-Spectrum Code Acquisition in the Presence of Doppler Shift and Data Modulation," IEEE Transactions on Communications, vol. 38, No. 2, Feb. 1990. 10 pages.
Duel-Hallen, Alexandra, "Decorrelating Decision-Feedback Multiuser Detector for Synchronous Code-Division Multiple-Access Channel," IEEE Transactions on Communications, vol. 41, No. 2, Feb. 1993. pp. 285-290. 6 pages.
Frankel et al., "High-performance photonic analogue-digital converter," Electronic Letters, Dec. 4, 1997, vol. 33, No. 25, pp. 2096-2097. 2 pages.
Garg, Vijay K. and Wilkes, Joseph E., "Wireless and Personal Communications Systems," Prentice Hall PTR, Upper Saddle River, NJ, US. 1996. 45 pages.
Halper, Christian; Heiss, Michael; and Brasseur, Georg, "Digital-to-Analog Conversion by Pulse-Count Modulation Methods," IEEE Transactions on Instrumentation and Measurement, vol. 45, No. 4, Aug. 1996. 10 pages.
Iltis, Ronald A. and Mailaender, Laurence, "Multiuser Detection of Quasisynchronous CDMA Signals Using Linear Decorrelators," IEEE Transactions on Communications, vol. 44, No. 11, Nov. 1996. 11 pages.
Jayaweera, Sudharman K. et al., "A RAKE-Based Iterative Receiver for Space-Time Block-Coded Multipath CDMA", IEEE Transactions on Signal Processing, vol. 52, No. 3, Mar. 2004. 11 Pages.
Kaplan, Elliott D., Editor, "Understanding GPS—Principles and Applications," Artech House, Norwood MA, US, 1996, pp. 152-236. (Provided publication missing pp. 83-151 of cited reference.) 46 pages.

Kohno, Ryuji, Imaj, Hideki, and Hatori, Mitsutoshi, "Cancellation techniques of Co-Channel Interference in Asynchronous Spread Spectrum Multiple Access Systems," May 1983, vol. J 56-A, No. 5. 8 pages.
Lin, Kun; Zhao, Kan; Chui, Edmund; Krone, Andrew; and Nohrden, Jim; "Digital Filters for High Performance Audio Delta-sigma Analog-to-Digital and Digital-to-Analog Conversions," Proceedings of ICSP 1996, Crystal Semiconductor Corporation, Austin, TX, US, pp. 59-63. 5 pages.
Lupas, Ruxandra and Verdu, Sergio, "Linear Multiuser Detectors for Synchronous Code-Division Multiple-Access Channels," IEEE Transactions on Information Theory, vol. 35, No. 1, Jan. 1989. 14 pages.
Lupas, Ruxandra and Verdu, Sergio, "Near-Far Resistance of Multiuser Detectors in Asynchronous Channels," IEEE transactions on Communications, vol. 38, No. 4, Apr. 1990. 13 pages.
Marinkovic, Slavica et al., "Space-Time Iterative and Multistage Receiver Structures for CDMA Mobile Communications Systems", IEEE Journal on Selected Areas in Communications, vol. 19, No. 8, Aug. 2001. 11 Pages.
Mitra, Urbashi and Poor, H. Vincent, "Adaptive Decorrelating Detectors for CDMA Systems," accepted for publication in the Wireless Communications Journal, accepted May 1995. 25 pages.
Mitra, Urbashi, and Poor, H. Vincent, "Adaptive Receiver Algorithms for Near-Far Resistant CDMA," IEEE Transactions of Communications, vol. 43, No. 2/3/4, Feb./Mar./Apr. 1995. 12 pages.
Mohamed, Nermin A. et al., "A Low-Complexity Combined Antenna Array and Interference Cancellation DS-CDMA Receiver in Multipath Fading Channels", IEEE Journal on Selected Areas in Communications, vol. 20, No. 2, Feb. 2002. 9 Pages.
Notice of Allowance and Fee(s) Due dated May 28, 2010 for U.S. Appl. No. 11/272,411. 7 pages.
Notice of Allowance and Fees Due dated Nov. 30, 2010 for U.S. Appl. No. 11/266,928 includes excerpt from Response to Final Office Action and Examiner's comments. 21 Pages.
Office Action dated May 6, 2007, dated Jun. 28, 2010, U.S. Appl. No. 11/266,928. 17 pages.
Ortega, J.G.; Janer, C.L.; Quero, J.M.; Franquelo, L.G.; Pinilla, J.; and Serrano, J., "Analog to Digital and Digital to Analog Conversion Based on Stochastic Logic," IEEE 0-7803-3026-9/95, 1995. 5 pages.
PCT Notification of Transmittal of International Search Report and Written Opinion of International Searching Authority dated Sep. 21, 2007, re Int'l Application No. PCT/US 06/36018. 10 pages.
Price, et al., "A Communication Technique for Multipath Channels," Proceedings to the IRE, vol. 46, The Institute of Radio Engineers, New York, NY, US, 1958. 16 pages.
Rappaport, Theodore S., Editor, "Wireless Communications—Principles & Practice," Prentice Hall, Upper Saddle River, NJ, US, 1996, pp. 518-533. 14 pages.
Reply Brief dated Jul. 30, 2010 in U.S. Appl. No. 11/233,636. 22 pages.
Response dated Aug. 17, 2010 to the Final Office Action of Jun. 28, 2010, U.S. Appl. No. 11/266,928. 47 pages.
Response dated May 13, 2010 to final Office Action dated Apr. 19, 2010 U.S. Appl. No. 11/272,411 includes Terminal Disclaimer. 6 Pages.
Response dated May 6, 2010 to Non-Final Office Action dated Dec. 14, 2009 U.S. Appl. No. 11/266,928. 43 Pages.
Scharf, et al., "Matched Subspace Detectors," IEEE Transactions on Signal Processing, vol. 42, No. 8, Aug. 1994. 12 pages.
Scharf, Louis L., "Statistical Signal Processing—Detection, Estimation, and Time Series Analysis," Addison-Wesley Publishing Company, 1991, pp. 23-75 and 103-178. 74 pages.
Schlegel, C.B.; Xiang, Z-J.; and Roy, S., "Projection Receiver: A New Efficient Multi-User Detector," IEEE 0-7803-2509-5/95, 1995. 5 pages.
Schlegel, Christian and Xiang, Zengjun, "A New Projection Receiver for Coded Synchronous Multi-User CDMA Systems," Proceedings, 1995, IEEE International Symposium on Information Theory, p. 318, Sep. 17, 1995. 1 page.

(56) References Cited

OTHER PUBLICATIONS

Schlegel, Christian, Alexander, Paul and Roy, Sumit, "Coded Asynchronous CDMA and Its Efficient Detection," IEEE Transactions on Information Theory, vol. 44, No. 7, Nov. 1998. 11 pages.

Schlegel, Christian; Roy, Sumit; Alexander, Paul D.; and Xiang, Zeng-Jun, "Multiuser Projection Receivers," IEEE Journal on Selected Areas in Communications, vol. 14, No. 8, Oct. 1996. 9 pages.

Schneider, Kenneth S., "Optimum Detection of Code Division Multiplexed Signals," IEEE Transactions on Aerospace and Electronic Systems, vol. AES-15, No. 1, Jan. 1979. 5 pages.

Stimson, George W., "An Introduction to Airborne Radar," 2nd Edition, SciTech Publishing Inc., Mendham, NJ, US, 1998, pp. 163-176 and 473-491. 40 pages.

Thomas, John K., "Thesis for the Doctor of Philosophy Degree," UMI Dissertation Services, Jun. 28, 1996. Ann Arbor, MI, US, 117 pages.

Verdu, Sergio, "Minimum Probability of Error for Asynchronous Gaussian Multiple-Access Channels," IEEE Transactions on Information Theory, vol. IT-32, No. 1, Jan. 1986. 12 pages.

Viterbi, Andrew J., "CDMA—Principles of Spread Spectrum Communication," Addison-Wesley Publishing Company, Reading, MA,US. 1995, pp. 11-75 and 179-233. 66 pages.

Viterbi, Andrew J., "Very Low Rate Convolutional Codes for Maximum Theoretical Performance of Spread-Spectrum Multiple-Access Channels," IEEE Journal on Selected Areas in Communications, vol. 8, No. 4, May 1990. pp. 641-649, 9 pages.

Wang, Xiaodong et al., "Space-Time Multiuser Detection in Multipath CDMA Channels", IEEE Transactions on Signal Processing, vol. 47, No. 9, Sep. 1999. 19 Pages.

Xie, Zhenhua; Short, Robert T. and Rushforth, Craig K., "A Family of Suboptimum Detectors for Coherent Multiuser Communications," IEEE Journal on Selected Areas in Communications, vol. 8, No. 4, pp. 683-690, May 1990. 8 pages.

Zheng, Fu-Chun and Barton, Stephen K., "On the Performance of Near-Far Resistant CDMA Detectors in the Presence of Synchronization Errors," IEEE Transactions on Communications, vol. 43, No. 12 (pp. 3037-3045), Dec. 1995. 9 pages.

B. Widrow, S. 'Stearns Adaptive Signal Processing', Prentice Hall, Signal Processing Series, 1985.

H. Yan et al, " Parallel Interference Cancellation for Uplink Multirate Overlay CDMA channels", IEEE Trans. Comm. V53,No. 1, Jan. 2005, pp. 152-161.

K. Hooli, et al, "Chip Level Channel Equalization in WCDMA Downlink", EURASIP Journal on Applied Signal Processing 2002:8, pp. 757-770.

J. Winters, "Optimal Combining in Digital Mobile Radio with Co channel Interference", IEEEE J. Selected Areas in Comm., V. SAC-2, No. 4, Jul. 1984, pp. 528-539.

M. Ali-Hackl, et. al, "Error Vector Magnitude as a Figure of Merit for CDMA Receiver Design", The Fifth European Wireless Conference Feb. 24-27, 2004.

D. Athanasios et. al, "SNR Estimation Algorithms in AWGN for Hiper LAN/2 Transceiver", MWCN 2005 Morocco, Sep. 19-21, 2005.

D. Divsalar, "Improved Parallel Interference Cancellation for CDMA", IEEE Trans. Comm., V46, No. 2, Feb. 1998, pp. 258-268.

T.Lim, S.Roy, "Adaptive Filters in Multiuser (MU) CDMA detection," Wireless Networks 4 (1998) pp. 307-318.

D.Guo,et. al, "A Matrix-Algebraic Approach to Linear Parallel Interference Cancellation in CDMA" IEEE Trans. Comm., V. 48, No. 1, Jan. 2000, pp. 152-161.

L. Rasmussen, et. al, "A Matrix-Algebraic Approach to Successive Interference Cancellation in CDMA" IEEE J. Selected Areas Comm. V. 48, No. 1, Jan. 2000, pp. 145-151.

D.Guo, et. al, "Linear Parallel Interference Cancellation in Long Code CDMA-Multiuser Detection" IEEE J. Selected Areas Comm. V.17, No. 12, Dec. 1999, pp. 2074-2081.

G. Xue, et. al, "Adaptive Multistage Parallel Interference Cancellation for CDMA" IEEE J. Selected Areas Comm. V.17, No. 10, Oct. 1999, pp. 1815-1827.

Y. Guo ,"Advance MIMO —CDMA receiver for Interference Suppression: Algorithms, Systems-on-Chips Architectures and Design Methodology," Doctoral Thesis, Rice University, May 2005, pp. 165-180.

J. Robler, et. al, "Matched—Filter and MMSE Based Iterative Equalization with Soft Feedback, for QPSK Transmission", International Zurich Seminar on Broadband Communication (IZS 2002) pp. 19-1-19-6, Feb. 2002.

H. Dai, et al, "Iterative Space—Time Processing for Multiuser Detection in Multipath CDMA Channels", IEEE Trans. Signal Proc., V.50, No. 9, Sep. 2002, pp. 2116-2127.

A. Yener, et. al, "CDMA Multiuser Detection : A Non-Linear Programming Approach", IEEE Trans. Comm., V. 50, No. 6, Jun. 2002, pp. 1016-1024.

A .Persson, et. al, "Time Frequency Localized CDMA for Downlink Multicarrier Systems", 2002 $7^{th}$ Int. Symp. Spread Spectrum, V. 1, 2002, pp. 118-122.

G.M.A. Sessler, "Low Complexity Polynomial Expansion Multiuser Detector for CDMA Systems", IEEE Trans. on Veh. Tech., 54(4), 1379-1391.

\* cited by examiner

ADVANCED SIGNAL PROCESSORS FOR INTERFERENCE CANCELLATION IN BASEBAND RECEIVERS

CROSS-REFERENCE TO RELATED APPLICATIONS

This application is a continuation of U.S. patent application Ser. No. 14/108,333, entitled "Advanced signal processors for Interference Cancellation in baseband receivers," filed Dec. 16, 2013, which is a continuation of U.S. patent application Ser. No. 12/892,874, entitled "Advanced signal processors for Interference Cancellation in baseband receivers," filed Sep. 28, 2010 and published as U.S. Patent Application Publication Number 2011-0019656 A1, which is a continuation of U.S. patent application Ser. No. 11/272,411, entitled "Variable interference cancellation technology for CDMA systems," filed Nov. 10, 2005, now U.S. Pat. No. 7,808,937, which (1) is a continuation-in-part of U.S. patent application Ser. No. 11/233,636, entitled "Optimal feedback weighting for soft-decision cancellers," filed Sep. 23, 2005 and published as U.S. Patent Application Publication Number 2006-0227909 A1. The entirety of each of the foregoing patents, patent applications, and patent application publications is incorporated by reference herein.

BACKGROUND

1. Field of the Invention

The present invention relates generally to interference cancellation in received wireless communication signals and, more particularly, to forming and using a composite interference signal for interference cancellation.

2. Discussion of the Related Art

In an exemplary wireless multiple-access system, a communication resource is divided into subchannels and allocated to different users. For example, subchannels may include time slots, frequency slots, multiple-access codes, spatio-temporal subchannels, or any combination thereof. A plurality of sub-channel signals received by a wireless terminal (e.g., a subscriber unit or a base station) may correspond to different users and/or different subchannels allocated to a particular user.

If a single transmitter broadcasts different messages to different receivers, such as a base station in a wireless communication system broadcasting to a plurality of mobile terminals, the channel resource is subdivided in order to distinguish between messages intended for each mobile. Thus, each mobile terminal, by knowing its allocated subchannel(s), may decode messages intended for it from the superposition of received signals. Similarly, a base station typically separates signals it receives into subchannels in order to differentiate between users.

In a multipath environment, received signals are superpositions of time delayed (and complex scaled) versions of the transmitted signals. Multipath can cause co-channel and cross-channel interference that correlates the allocated subchannels. For example, co-channel interference may occur when time-delayed reflections of transmitted signals from the same source interfere with each other. Cross-channel interference occurs when signals in a sub channel leak into and, thus, impair acquisition and tracking of other subchannels.

Co-channel and cross-channel interference can degrade communications by causing a receiver to incorrectly decode received transmissions, thus increasing a receiver's error floor. Interference may also have other degrading effects on communications. For example, uncancelled interference may diminish capacity of a communication system, decrease the region of coverage, and/or decrease maximum data rates. Previous interference-cancellation techniques include subtractive and projective interference cancellation, such as disclosed in U.S. Pat. Nos. 6,856,945 and 6,947,474, which are hereby incorporated by reference.

SUMMARY OF THE INVENTION

In view of the foregoing background, embodiments of the present invention may be employed in receivers configured to implement receive diversity and equalization. Embodiments may provide for optimally forming and using at least one composite interference vector (CIV) for use in any subtractive or projective interference canceller. Such embodiments may be employed in any receiver employing a Rake, such as (but not limited to) receivers configured to receive ultra-wideband (UWB), Code Division Multiple Access (CDMA), Multiple-Input/Multiple-Output (MIMO), and narrowband single-carrier signals. Embodiments of the invention may provide for analytically characterizing the signal-to-interference-and-noise ratio (SINR) in a composite signal or in a user subchannel, and choosing feedback terms (e.g., adaptive weights) to construct an interference-cancelled signal that maximizes this quantity.

Embodiments of the invention employ soft weighting of a projective operation to improve interference cancellation. For example, each finger of a Rake receiver is matched to a particular time delay and/or base station spreading code to combat the effects of frequency-selective fading and interference from multiple base stations, respectively. Interfinger interference occurs due to loss of orthogonality in the user waveforms resulting from multi paths in the transmission channel. This interference may be mitigated by feeding soft estimates of active users' waveforms between the Rake fingers in order to improve the SINR at the output of each finger. The optimization is performed per Rake finger prior to combining. In a receiver employing receive diversity, fingers that are common to two or more receive paths may be combined using any of various well-known statistical signal-processing techniques.

In one embodiment of the invention, a means for generating one or more CIVs, a means for generating a soft-projection operator, and a means for performing a soft projection are configured to produce an interference-cancelled signal from a received baseband signal. The means for generating the one or more CIVs may include, by way of example, any means for deriving soft and/or hard estimates from a receiver and synthesizing the one or more CIVs therefrom. For example, the means for generating the one or more CIVs may include a symbol estimator (e.g., a symbol estimator in a receiver employing any combination of Rake processing, receive diversity, and equalization), a sub channel selector, a fast Walsh transform, and a PN coder. The means for generating the one or more CIVs may further include a channel emulator. The means for generating a soft-projection operator may include, by way of example, a soft-projection matrix generator or an interference-cancelling operator that includes a means for selecting a soft weight that maximizes a post-processing SINR. The means for performing a soft projection may include, by way of example, a signal processor configured to project a received baseband signal as specified by the soft-projection operator in order to produce an interference-cancelled signal.

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Various functional elements, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

These and other embodiments of the invention are described with respect to the figures and the following description of the preferred embodiments.

BRIEF DESCRIPTION OF THE DRAWINGS

Embodiments according to the present invention are understood with reference to the flow diagram of FIG. 1 and the schematic block diagrams of FIGS. 2A and 2B.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

A received baseband signal at a user handset having K base stations (or subchannels), U users, L propagation paths, and a sequence of transmitted symbols $\{b_k[m]\}$ can be expressed by $$y[n] = \sum_{k=1}^{K} \sum_{m=-\infty}^{\infty} \sum_{l=1}^{L} c_{k,l} s_k[n - Nm - d_{k,l}, b_k[m]] + v[n]$$

where $\{s_k[n, b_k[m]]\}$ is a discrete-time symbol-bearing waveform from base station k that has N samples per symbol period, the vector sequence $\{b_k[m]\}$ is a sequence of U user information symbols $b_k[m] = [b_{k,1}[m], \ldots, b_{k,U}[m]]$ from base station k, the values $C_{k,l}$ and $d_{k,l}$ are the complex channel fading coefficients and the time delays characterizing the propagation channel linking the $k^{th}$ base station to the receiver, and v[n] is additive noise having power $\sigma^2$. When a multi-code (e.g., CDMA, DSSS, WCDMA, DO) transmission is employed, a transmitted waveform can be represented as $$s_k[n, b_k[m]] = \sum_{u=1}^{u} b_{k,u}[m] w_{k,u}[n], mN \le n < (m+1)N$$

where U is the number of users, $b_{k,u}[m]$ is a user data symbol (which is drawn from a finite constellation and is constant over symbol intervals of sample length N), and $w_{k,u}[n]$ is a user spreading code (including PN, covering, and filtering), which is typically time varying at the sample rate. The sampling rate corresponding to n is taken to be the normalized rate 1 and assumed to be greater than the chip rate. The received signal y[n] may be organized into a sequence of vectors at rate 1/N $$y[m] = \sum_{k=1}^{K} \sum_{m'} \sum_{l}^{L} c_{k,l} W_{k,l}[m - m'] b_k[m']] + v[m],$$

where $b_k$ contains symbols $b_{k,u}$ and the columns of the matrix $W_{k,l}$ comprise vectors of the form $$w_{k,l,u} = [w_{k,l,u}[mN - d_l], \ldots, w_{k,l,u}[(m+1)N - 1 - d_l]]^T$$

Thus, the sampling rate corresponding to m remains 1/N.

The optimal receiver for a given user information sequence depends on the cellular network's operating mode (e.g., soft handoff, blocking). For example, if a particular handset is not in handoff and there is no inter-base-station interference (i.e., K=1), the optimal detection strategy for a single symbol of interest corresponding to a designated user is $$b_u[m] = \operatorname*{argmax}_{b} \max_{\{b_{u'}[m']\}: b_u[m] = b} \operatorname{Re} \sum_{l} \bar{c}_l s_l^*[m; \{b[m']\}] \left( y[m] - \frac{1}{2} s[m; \{b[m']\}, l] \right)$$

where overbar denotes a complex conjugate and superscript * denotes a Hermitian transpose. The term $s_l[m; \{b[m']\}]$ is a received signal vector, delayed by $d_l$ corresponding to the vector-valued information sequence $\{b[m']\}$, and the vector $$s[m; \{b[m']\}, l] = \sum_{l' \ne l} c_{l'} s_{l'}[m; \{b[m']\}]$$

represents an interference signal formed from all of the paths not equal to path l. This exemplary embodiment impels approximations that cancel interference terms $s_l[m; \{b[m']\}]$ from received signals, in advance of Rake reception (i.e., the sum over l of $c_l s_l[m]$. The vector $s_l[m; \{b[m']\}]$ may be expressed as $$s_l[m; \{b[m']\}] = [s[mN - d_l, \{b[m]\}], \ldots, s[(m+1)N - 1 - d_l, \{b[m']\}]]$$

When the complex baseband signal y[m] is resolved at a particular ($l^{th}$) finger in a handset's Rake receiver, it can be simplified to a vector representation $$y = c x_u b_u + x_{MAI} + x_{INT} + v$$

where y represents received data after it passes through a receiver pulse-shaping filter (e.g., a root raised-cosine pulse-shaping filter). The data y is time aligned to a particular path delay. The term c is a complex attenuation corresponding to the path.

When the modulation is linear, the term $x_u$ in path l, which represents a code waveform that typically includes an orthogonal basis code and an overlaid spreading sequence (e.g., a PN code) assigned to a user of interest, may be written as $$x_{1,l,u}[m] = c_{1,l} w_{1,l,u} b_{1,u}[m]$$

The term $W_{1,u}$ is the spread and scrambled code for user u in cell k=1, and $b_{1,u}$ is an information symbol corresponding to the user of interest. The term $x_{MAI}$ is multiple access interference, and it may be expressed by $$x_{1,l,MAI}[m] = c_l \sum_{u' \neq u} w_{1,l,u} b_{1,u}[m].$$

The term $x_{INT}$ may include inter-finger (and possibly inter-base-station) interference terms that are similar in form to $x_{MAI}$. The term v is a vector of complex additive noise terms. Each of the vectors $x_u$, $x_{MAI}$, and $x_{INT}$ is a signal resolved onto a Rake finger matched to the $l^{th}$ multipath delay of base station k at symbol period m.

A conventional Rake receiver resolves the measurement $x_u$ onto a user's code vector to form the statistic $x_u * y_l$. Such statistics are typically derived from multiple Rake fingers and coherently combined across the paths via a maximum ratio combiner (i.e. they are weighted by the conjugate of the channel gains and summed). Alternatively, more general combining may be used.

Figure 1:
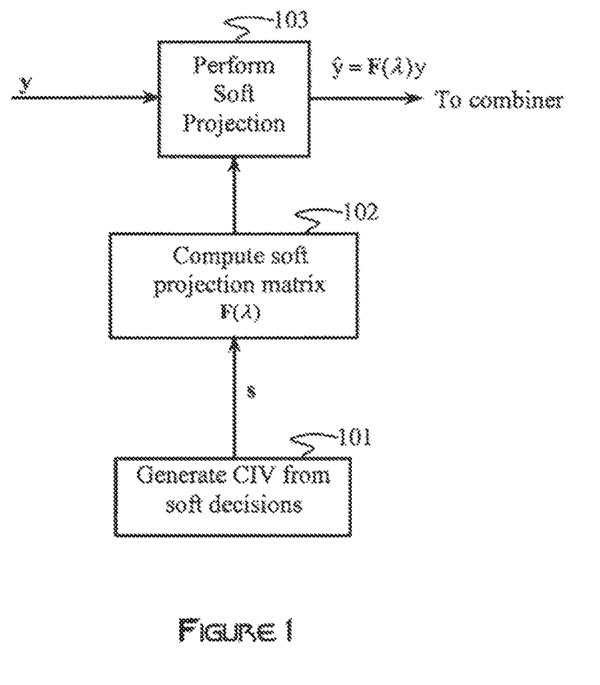
FIG. 1 is a flow diagram of an interference-cancelling method for a particular multipath component.

FIG. 1 illustrates a signal processing method in accordance with an exemplary embodiment of the invention that is configured to reduce ISI in a received signal from a particular Rake finger. A CIV s is generated 101 by combining soft or hard estimates of interference corresponding to the other delays and/or base stations not tracked by the particular finger. For example, the soft estimates may correspond to interfering user subchannels from each base station tracked by a cellular handset. Soft or hard estimates may be derived from a conventional Rake receiver, an equalizer, or any detector matched to the communication protocol and channel conditions of a received signal. Embodiments of the invention may be configurable to operate within receivers employing receive diversity, equalization, transmit diversity combining, and/or space-time decoding.

Embodiments of the invention may include one or more CIVs. Therefore, in parts of the disclosure that describe a CIV, it is anticipated that a plurality of CIVs may be used. For example, specific embodiments may employ a matrix whose columns are CIVs. The CIV s is constructed from known and/or estimated active subchannels and then used to compute a soft projection matrix 102, $$F(\lambda) = I - \lambda ss^*.$$

The matrix $F(\lambda)$ is configured to operate on a received data vector y 103 to produce an interference-cancelled signal $\hat{y} = F(\lambda)y$, which is coupled to a Rake processor or combiner (not shown). The term I is an identity matrix, and the weight $\lambda$ may be determined symbol-by-symbol in order to maximize a post-processing SINR, $$\Gamma(\lambda) = \frac{|x_u^* F(\lambda) x_u|^2}{E|x_u^* F(\lambda) x_{MAI}|^2 + E|x_u^* F(\lambda) x_{INT}|^2 + \sigma^2 x_u^* F(\lambda) F^*(\lambda) x_u}$$

In this expression, each vector of the form $x_u$ is $x_u[m]$, corresponding to symbol period m. Therefore, the post-processing SINR $\Gamma(\lambda)$ is measured symbol period-by-symbol period. The user powers are absorbed into the component vectors $x_u$, $x_{MAI}$, and $x_{INT}$. These powers are known or estimated.

At each symbol period, the SINR at a given finger can be expressed as $$\Gamma(\lambda) = \frac{a + b\lambda + c\lambda^2}{d + e\lambda + f\lambda^2}$$

The coefficients are $$a = |x_u^* x_u|^2$$
$$b = -2 x_u^* x_u |x_u^* s|^2$$
$$c = |x_u^* s|^4$$
$$d = \sum_{u' \neq u} |x_u^* x_{u'}|^2 + |x_u^* s|^2 + \sigma^2 x_u^* x_u$$
$$e = -2 \operatorname{Re}\left( \sum_{u' \neq u} (x_u^* x_{u'})(x_u^* s)(s^* x_{u'}) + |x_u^* s|^2 s^* s + \sigma^2 |x_u^* s|^2 \right)$$
$$f = \sum_{u' \neq u} |x_u^* s|^2 |s^* x_{u'}|^2 + |x_u^* s|^2 |s^* s|^2 + \sigma^2 |x_u^* s|^2 (s^* s)$$

wherein each of the inner products may be computed from the user codes $w_k[m]$ and complex amplitudes $b_{l,u}[m]$ identified for user u at baud interval m. If orthogonal spreading codes are used, the expression $x_u^* x_{u'}$ with $u' \neq u$ is zero. Furthermore, the relevant inner product $x_u^* s$ can be efficiently obtained for a CDMA/WCDMA system by passing the synthesized CIV s for the finger of interest through a fast Walsh transform (FWT). Computing the soft projection matrix 102 may include a step of maximizing the SINR $\Gamma(\lambda)$ by setting its derivative (with respect to $\lambda$) to zero (not shown), resulting in the following polynomial equation $$(ce - bf)\lambda^2 + 2(cd - af)\lambda + (bd - ae) = 0.$$

One of the roots of the polynomial equation corresponding to the maximum SINR is selected (not shown) and then used to scale ss* in the matrix $F(\lambda)$. Once computed, $F(\lambda)y$ may be scaled to conform to downstream processing in a baseband receiver.

It should be appreciated that variations to the previously described process for determining the weight $\lambda$ may be made without departing from the spirit and scope of the claimed invention. For example, when a cellular handset is in a soft-handoff mode, there is an additional quadratic term in the numerator of $\Gamma(\lambda)$ corresponding to the received signal power from the second base station, and there is one less term in the denominator. This changes the function $\Gamma(\lambda)$, but it does not change the procedure for determining the value of $\Gamma(\lambda)$ that maximizes $\Gamma(\lambda)$. Furthermore, algorithms for maximizing $\Gamma(\lambda)$ may be incorporated into other receiver processing techniques, such as (but not limited to) Rake path tracking, active user determination, amplitude estimation, receive diversity, and equalizing. $\Gamma(\lambda)$ may be approximately maximized with variations or stochastic gradients.

Figure 2A:
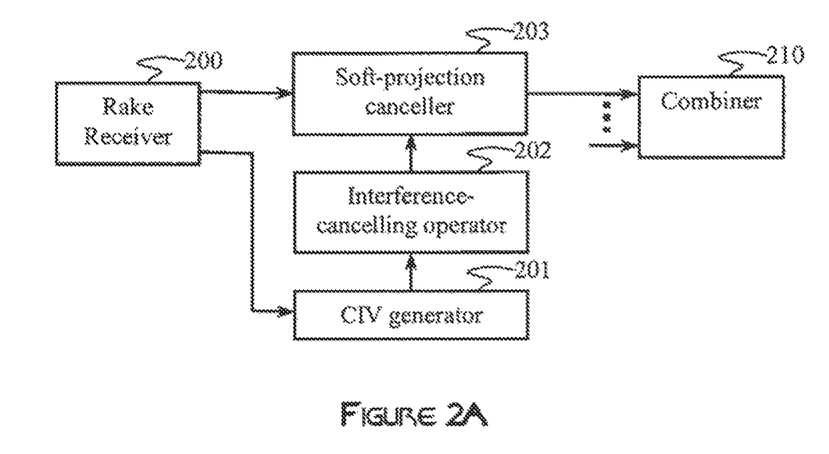
FIG. 2A is a schematic block diagram of a circuit configured for cancelling interference and combining interference-cancelled multipath components.

FIG. 2A is a schematic block diagram of a circuit in accordance with an alternative embodiment of the invention that includes a CIV generator 201, an interference-cancelling operator 202, and a soft-projection canceller 203. Inputs to the CIV generator 201 and the soft-projection canceller 203 are coupled to outputs of a Rake receiver 200. An output of the soft-projection canceller 203 is coupled to the input of a combiner 210.

Figure 2B:
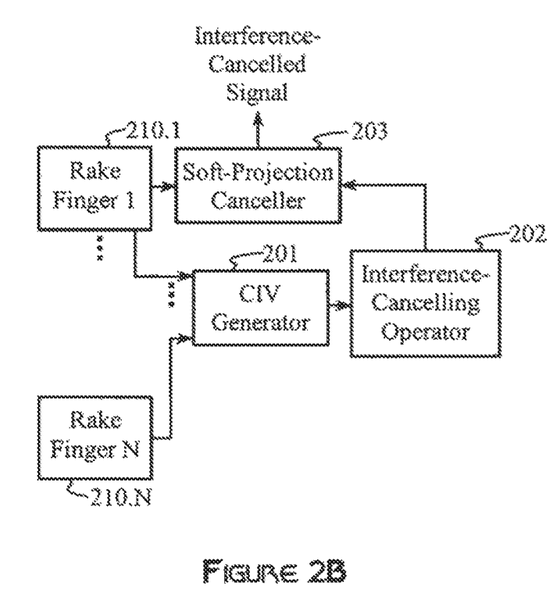
FIG. 2B is a schematic block diagram of a circuit configured for cancelling interference from at least one finger of a Rake receiver that produces a CIV from signals received by all fingers of the Rake receiver.

The soft-projection canceller 203 is configured to cancel interference from at least one path (or finger) of the Rake receiver 200. Soft and/or hard estimates from at least one other path or finger are processed by the CIV generator 201 to produce a CIVs. For example, FIG. 2B shows signals from rake fingers 210.1-210.N being used to construct a CIV in order to cancel interference from one of the rake fingers (e.g., 210.1). The interference-cancelling operator 202 uses the CIV s and user code $x_u$ to compute a soft-projection matrix. The soft-projection matrix computes the weight value $\lambda$ that maximizes the SINR of the interference-cancelled signal $\hat{y}=F(\lambda)y$. The interference-cancelled signal 5 output from the soft-projection canceller 203 may be coupled into the combiner 210 and combined with interference-cancelled signals from other paths or Rake fingers.

The functions of the various elements shown in the drawings, including functional blocks, may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include currently known equivalents as well as equivalents developed in the future, i.e., any elements developed that perform the same function, regardless of structure.

The invention claimed is:

1. A method for cancelling interference from a received baseband signal, the method comprising:
   generating at least one composite interference vector (CIV) by combining estimates from interfering subchannels, wherein the estimates are derived from at least one of a Rake receiver, an equalizer, a receiver employing receive diversity, a receiver employing transmit diversity combining, or a receiver employing space-time decoding;
   generating a soft-projection matrix corresponding to the at least one CIV; and
   operating on the received baseband signal using the soft-projection matrix to output an interference-cancelled signal.

2. The method of claim 1, wherein:
   the generating at least one CIV comprises deriving the estimates from the Rake receiver; and
   each finger of the Rake receiver is matched to at least one of a time delay or a base station spreading code.

3. The method of claim 1, wherein the generating at least one CIV further comprises generating at least one or more soft estimates corresponding to interfering user subchannels from each base station tracked by a cellular handset.

4. The method of claim 1, wherein the soft-projection matrix includes a weight that increases a post-processing signal-to-interference-plus-noise-ratio (SINR).

5. The method of claim 1, wherein the operating on the received baseband signal further comprises coupling the interference-cancelled signal to at least one of a combiner or a Rake receiver.

6. An apparatus for cancelling interference from a received baseband signal, comprising:
   at least one memory storing software; and
   at least one processor capable of executing the software to perform operations comprising:
     generating at least one composite interference vector (CIV) by combining estimates from interfering subchannels, wherein the estimates are derived from at least one of a Rake receiver, an equalizer, a receiver employing receive diversity, a receiver employing transmit diversity combining, or a receiver employing space-time decoding;
     generating a soft-projection matrix corresponding to the at least one CIV; and
     operating on the received baseband signal using the soft-projection matrix to output an interference-cancelled signal.

7. The apparatus of claim 6, wherein the at least one processor is capable of executing the software to perform operations comprising:
   the generating at least one CIV comprises deriving the estimates from the Rake receiver.

8. The apparatus of claim 7, wherein each finger of the Rake receiver is matched to at least one of a time delay or a base station spreading code.

9. The apparatus of claim 6, wherein the at least one processor is capable of executing the software to perform operations comprising:
   the generating at least one CIV further comprises generating at least one or more soft estimates corresponding to interfering user subchannels from each base station tracked by a cellular handset.

10. The apparatus of claim 6, wherein the soft-projection matrix includes a weight that increases a post-processing signal-to-interference-plus-noise-ratio (SINR).

11. The apparatus of claim 6, wherein the at least one processor is capable of executing the software to perform operations comprising:
    wherein the operating on the received baseband signal further comprises coupling the interference-cancelled signal to at least one of a combiner or a Rake receiver.

12. At least one non-transitory computer-readable medium including software that, when executed by at least one processor, causes operations comprising:

generating at least one composite interference vector (CIV) by combining estimates from interfering sub-channels, wherein the estimates are derived from at least one of a Rake receiver, an equalizer, a receiver employing receive diversity, a receiver employing transmit diversity combining, or a receiver employing space-time decoding;

generating a soft-projection matrix corresponding to the at least one CIV; and operating on a received baseband signal using the soft-projection matrix to output an interference-cancelled signal.

13. The at least one non-transitory computer-readable medium of claim 12 that includes software that, when executed by the at least one processor, causes further operations comprising:

the generating at least one CIV comprises deriving the estimates from the Rake receiver.

14. The at least one non-transitory computer-readable medium of claim 13, wherein each finger of the Rake receiver is matched to at least one of a time delay or a base station spreading code.

15. The at least one non-transitory computer-readable medium of claim 12 that includes software that, when executed by the at least one processor, causes further operations comprising:

the generating at least one CIV further comprises generating at least one or more soft estimates corresponding to interfering user subchannels from each base station tracked by a cellular handset.

16. The at least one non-transitory computer-readable medium of claim 12, wherein the soft-projection matrix includes a weight that increases a post-processing signal-to-interference-plus-noise-ratio (SINR).

17. The at least one non-transitory computer-readable medium of claim 12 that includes software that, when executed by the at least one processor, causes further operations comprising:

wherein the operating on the received baseband signal further comprises coupling the interference-cancelled signal to at least one of a combiner or a Rake receiver.

* * * * *